Feb. 17, 1953  J. H. HILLDALE  2,628,738
COOKING DEVICE
Filed Nov. 5, 1947  3 Sheets-Sheet 1

Inventor:
John H. Hilldale
by his Attorneys
Howson & Howson

Feb. 17, 1953     J. H. HILLDALE     2,628,738
COOKING DEVICE
Filed Nov. 5, 1947     3 Sheets-Sheet 2
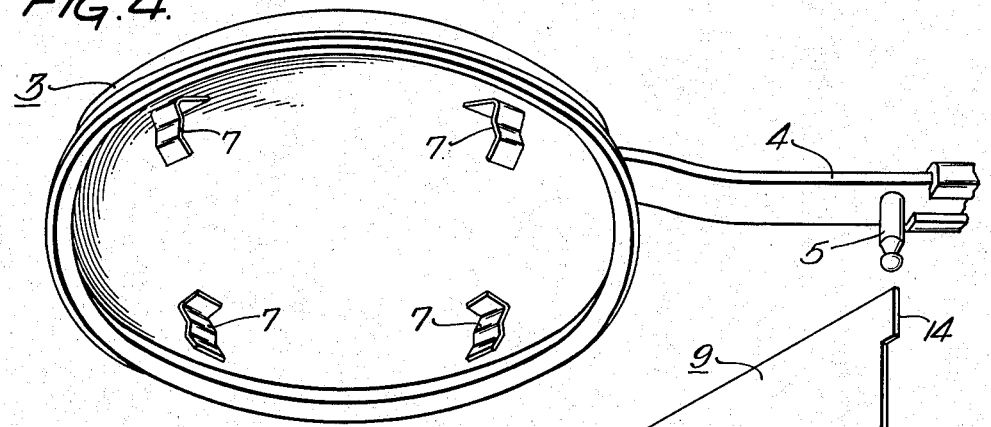
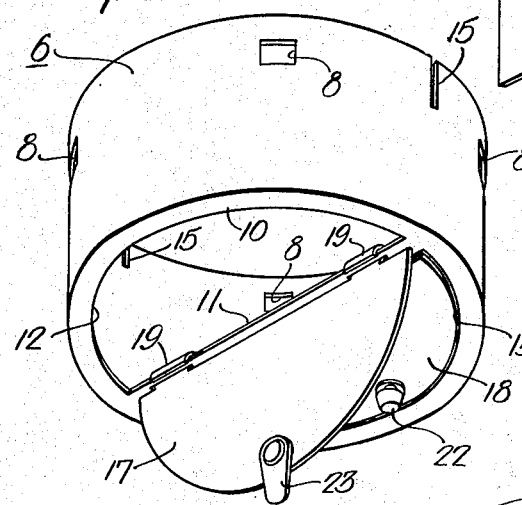
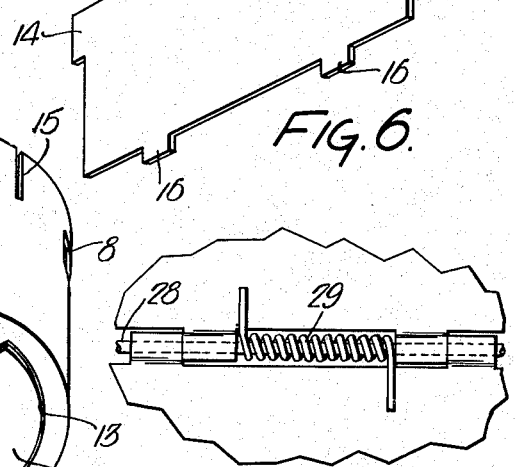
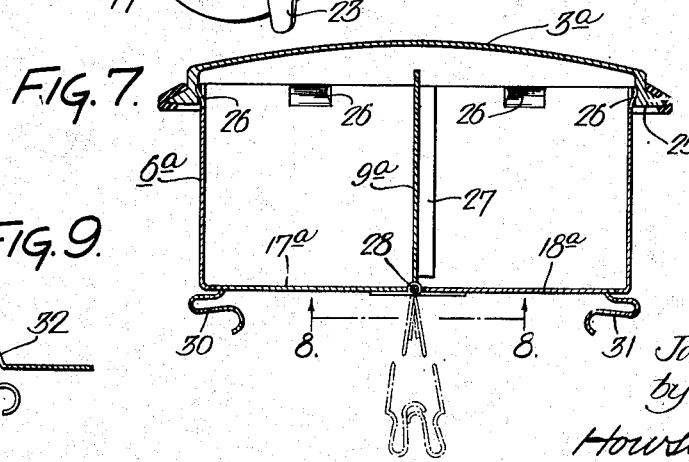
Inventor:
John H. Hilldale
by his Attorneys
Howson & Howson Patented Feb. 17, 1953

2,628,738

UNITED STATES PATENT OFFICE 2,628,738

COOKING DEVICE

John H. Hilldale, Philadelphia, Pa., assignor to Proctor Electric Company, Philadelphia, Pa., a corporation of Pennsylvania Application November 5, 1947, Serial No. 784,245

5 Claims. (Cl. 220—23)

This invention relates to cooking vessels, and more particularly to those vessels having dividers by means of which different foods may be cooked without mixing. While the invention is particularly concerned with pressure cookers, it is not limited thereto.

It has been proposed heretofore to provide an auxiliary container within a cooking vessel such as a pressure cooker, and it has been proposed to provide such a container removably attached to the lid or cover of such a vessel. Prior devices of this character have been impractical, however, because the auxiliary container must be removed from the lid in order to place food therein. In many instances of use of such a device, particularly in the case of a pressure cooker, it is desired to place food in the auxiliary container after other food in the main vessel is partially cooked and while the vessel is in a heated condition. The necessity of removal of the auxiliary container makes it difficult to do so and subjects the user to serious danger of being burned.

The principal object of the present invention is to provide a practical and highly useful cooking device of the general character above mentioned.

The invention has for a further object the provision of a divider for a lidded cooking vessel which permits the user to place foods to be cooked into the heated vessel with a minimum of annoyance from hot steam and with a minimum of danger of being burned due to contact with the heated vessel.

Another object is the provision of means whereby different colored vegetables may be cooked in the same container without danger of discoloration due to the flow of coloring juices from one compartment to another.

A still further object is to provide for the more complete utilization of the space within a cooking vessel such that better cooking economy is realized.

Other objects and features of the invention will be apparent from the following detailed description with reference to the accompanying drawings, wherein:

Fig. 4 is a perspective view of the pressure cooker lid with the auxiliary food container removed therefrom;

Fig. 5 is a perspective view of the auxiliary food container with the central partition removed therefrom;

Fig. 6 is a perspective view of the partition;

Fig. 7 is a sectional view of a modified form of the device;

Fig. 8 is a fragmentary bottom view of a portion of the auxiliary food container shown in Fig. 7;

Fig. 9 is a fragmentary sectional view illustrating a modification of the device shown in Figs. 7 and 8;

Figure 1:
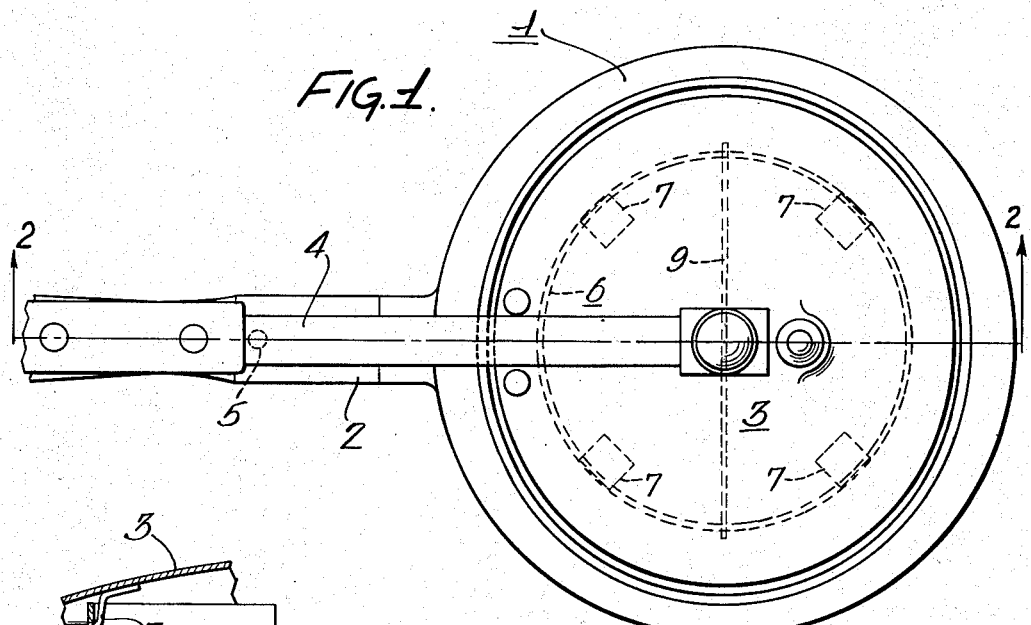
Fig. 1 is a plan view of a pressure cooker embodying the present invention.
Figure 2:
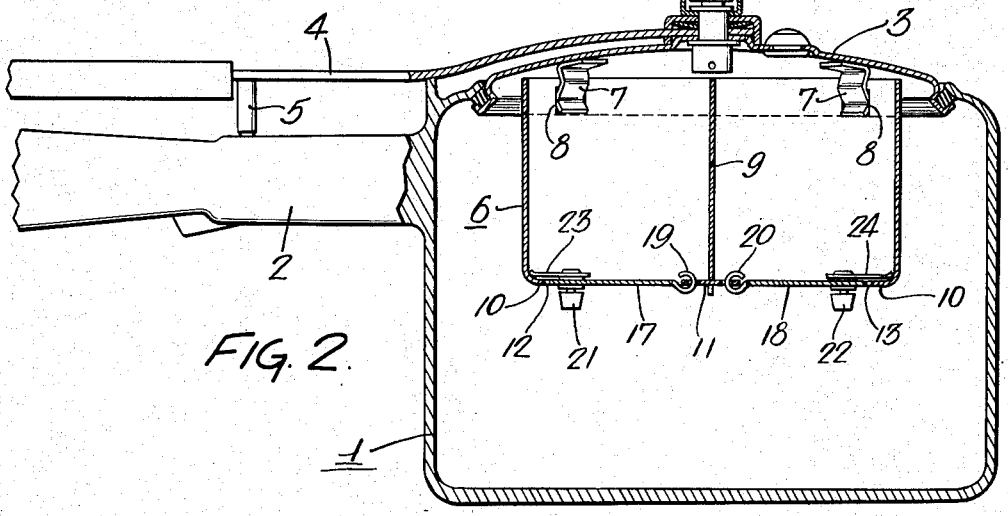
Fig. 2 is a view showing the pressure cooker in section along line 2—2 of Fig. 1.
Figure 10:
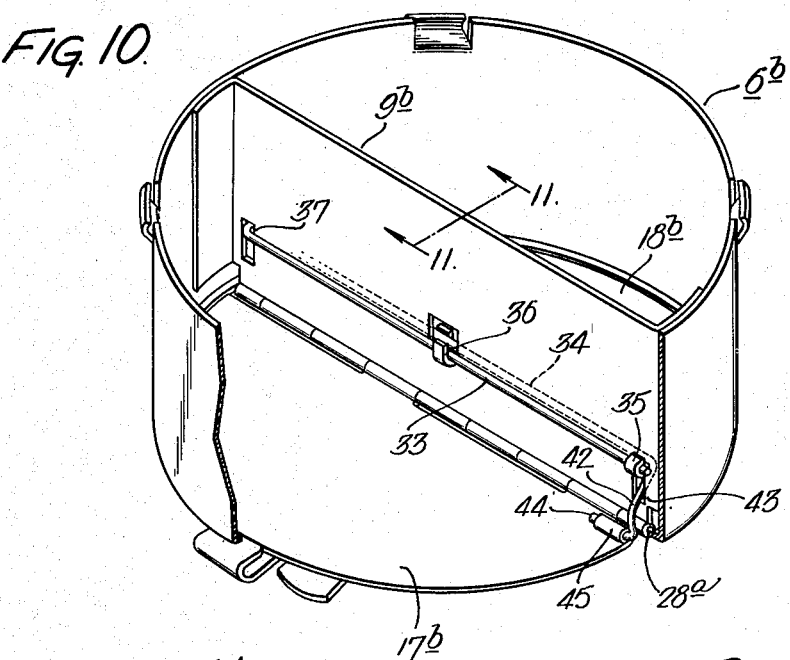
Fig. 10 is a perspective view of another form of the device provided by the invention.

Referring first to Figs. 1 and 2, the pressure cooker shown therein is of the type disclosed and claimed in a copending application of C. R. Turner, Serial No. 672,363, filed May 27, 1946, now Patent No. 2,570,993.

This pressure cooker comprises a vessel 1 having a handle 2 and a lid 3 having a handle 4. When the lid is in place as shown, the lid handle 4 is latched to the vessel handle 2 by latching means comprising a latch member 5 projecting downward from the lid handle and a cooperative latch member within the vessel handle 2. The present invention is not concerned with the details of construction of the pressure cooker, the cooker shown being intended merely as representative of a cooking device with which the present invention may be associated. It is unnecessary, therefore, to describe the pressure cooker further.

Figure 3:
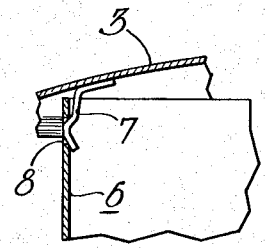
Fig. 3 is a detail sectional view showing more clearly one of the retainer elements for the auxiliary food container.

In accordance with the present invention, an auxiliary food container 6 is removably suspended from the underside of the lid 3 so that said container is disposed within the cooking vessel 1 when the lid is in place thereon, as clearly shown in Fig. 2. In the embodiment illustrated in Figs. 1 to 6, the auxiliary food container 6 is removably supported on the lid by means of spring clips 7 permanently secured to the lid 3 and by means of cooperative openings 8 in the wall of the container 6, which openings are adapted to receive the depending portions of the spring clips, as may be clearly seen in Figs. 2 and 3. The spring clips 7 may be permanently secured to the lid 3 in any suitable manner, as by brazing or riveting, or by being cast into the lid. The container 6 is easily attachable to or detachable from the lid simply by forcibly engaging it with or disengaging it from the resilient spring clips. However, while the container 6 is removable from the lid, an important feature of the structure is the utility of the auxiliary container without removal thereof from the lid. Accordingly, the container 6 is of such size and shape that it may be inserted into and withdrawn from the vessel 1, while attached to the lid 3, during the application or removal of the lid.

In further accordance with the invention, the auxiliary food container 6 is adapted for insertion or removal of food without separation or removal of the container from the lid. It is preferred also that the auxiliary food container shall be divided into a plurality of compartments in order that different foods may be placed in said compartments. In the specific embodiment shown in Figs. 1 to 6, the auxiliary food container 6 is divided into two compartments by means of a central partition 9. As shown in Figs. 2 and 5, the container 6 is formed at its bottom to provide an inturned peripheral flange 10 and a diametrical strip 11, these elements defining substantially semicircular openings 12 and 13. The partition 9 (see Fig. 6) is adapted for removal from the container 6, the partition having projecting tabs 14 which seat in slots 15 provided on the container wall, and the partition also having bottom tabs 16 which seat in slots in the strip 11.

A pair of doors 17 and 18 are hingedly attached to the strip 11 by means of simple hinge structures 19 and 20 (see Fig. 2), and these doors serve to close the openings 12 and 13 through which access is had to the compartments of the container. The doors are provided with rotatable knobs 21 and 22 having latch arms 23 and 24 secured thereto, said arms serving with the flange 10 to latch the doors in closed position, as shown in Fig. 2.

Another embodiment of the device is shown in Figs. 7 and 8. In this instance, the pressure cooker lid 3a has recesses in its peripheral flange portion 25 to receive spring tabs 26 provided on the wall of the auixlary food container 6a. The partition 9a is permanently secured to the container wall, as by means of flanges 27 at the ends of the partition. At the bottom of the partition, there is provided a hinge pin 28 which extends diametrically across the bottom of the container. A pair of doors 17a and 18a are hingedly attached to the pin 28, and a spring 29 urges the doors toward closed position. The doors are provided with spring clips 30 and 31 which are easily engageable by the fingers to open the doors, and which are cooperative to hold the doors open, as shown in dot-and-dash outline in Fig. 7.

If desired, the spring clips in the device of Figs. 7 and 8 may be utilized to hold the doors in closed position, eliminating the need for the spring 29. As shown in Fig. 9, each of the spring clips of Fig. 7 may be bent as at 32 to resiliently engage the associated edge of the container 6a so as to hold the door in closed position.

Figure 11:
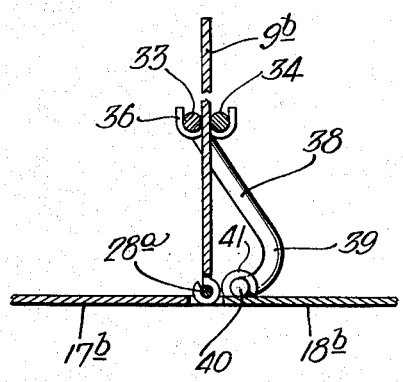
Fig. 11 is a fragmentary sectional view taken along a vertical plane through the line 11—11 of Fig. 10.
Figure 12:
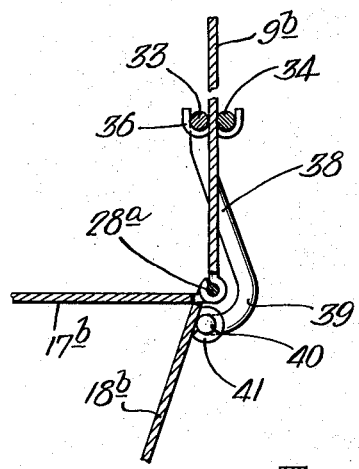
Fig. 12 is a similar view showing certain of the parts in different positions.
Figure 13:
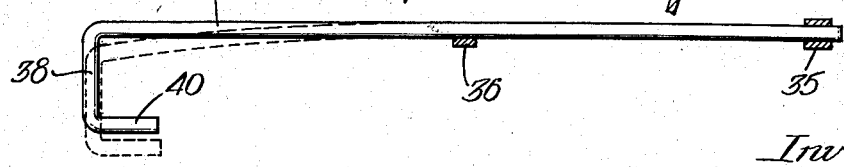
Fig. 13 is a detail view looking at one of the spring elements in side elevation, and showing the manner in which the spring elements are actuated.

In Figs. 10 to 13, there is shown another form of the device in which the partition 9b is permanently secured to the wall of the container 6b in the manner of the device shown in Figs. 7 and 8, and the doors 17b and 18b are hingedly mounted on a hinge pin 28a. In this instance, however, a pair of spring members in the form of resilient rods 33 and 34 are associated with the doors and are arranged for over-center action so that each spring member will hold the associated door either in closed position or in open position. The mounting of spring member 33 is clearly illustrated in the figures, and, as will be seen presently, the two springs are similarly mounted. Referring to the spring member 33, one end of this member is anchored (Figs. 10 and 12) by means of a tab 35 turned out from the partition 9b. Intermediate its ends, the spring member 33 is supported by another tab 36 turned out from the partition 9b. The other end of this spring member is bent, as shown in Figs. 11 to 13, and extends through a slot opening 37 in the partition 9b. The latter end portion of the spring member extends transversely and downwardly, as at 38, and is curved as at 39. The extreme end portion is bent to provide an extension 40 which is freely held by a tubular retaining element 41 on the door 18b.

Considering the operation of the door 18b, when it is in closed position, the spring member 33 is in its normal position, as shown in the solid line representation in Fig. 13, and the resilience of said member holds the door in its closed position. When the door 18b is moved to the open position, as shown in Fig. 12, the portion of the spring member beyond the support 36 flexes downward as shown in the broken line representation of Fig. 13. When the door is fully opened, the end portion 40 of the spring member is slightly beyond the hinge pin 28a, as may be seen in Fig. 12, and the door is held open by the resilience of the spring member which is then in a downwardly flexed condition. When the door is moved back toward its closed position, as soon as the end portion 40 passes beyond the hinge pin 28a, the resilience of the spring member is effective to move the door to the closed position.

The other spring member 34 is similarly arranged in opposite relation to the spring member 33 and on the opposite side of partition 9b. As may be seen in Fig. 10, the movable portion 42 of spring member 34 extends through a slot opening 43 in the partition 9b, and the extreme end portion 44 of said member is freely held by a tubular retaining element 45 on the door 17b. The operation of the door 17b and its associated spring member 34 is the same as in the case of the other door and its associated spring member.

It will be noted that in this embodiment of the device, the doors are held open or closed individually by their respective spring members, which facilitates use of the device. The user can easily hold the pressure cooker lid in inverted position with one hand while using the other hand to manipulate the doors of the auxiliary food container and to place food therein.

It will be seen from the foregoing description of the illustrated embodiments that the invention provides an auxiliary food container which has important advantages over devices of this general character heretofore proposed. The device of the invention is particularly useful on a pressure cooker, as it makes possible the simultaneous cooking of foods which require different cooking times. For example, a slow-cooking food may be partially cooked in the main vessel, and then quick-cooking foods can be inserted in the auxiliary container for simultaneous cooking with the first food. This merely requires reduction of the steam pressure and removal of the lid. Insertion of foods in the auxiliary container may be easily accomplished by turning the lid upside down.

Thus, the auxiliary container may be filled and emptied without disturbing the remaining contents of the cooking vessel and without inconvenience or difficulty on the part of the user.

It will be understood, of course, that the subdivision of the auxiliary container into a plurality of compartments is an optional feature, and furthermore the number of such compartments is a matter of choice.

It is to be understood further that the illustrated embodiments are not intended to limit the invention which is obviously capable of various forms of physical expression.

I claim:

1. A steam pressure cooker adapted for the cooking of food in the lower portion thereof by the combined heat and pressure within said cooker, comprising a vessel having an open upper end, a lid bodily removable from said vessel and adapted to close said open end in pressure sealing relation, an auxiliary food container attached to the underside of said lid and adapted for the reception of food to be cooked in the upper portion of said cooker by the combined heat and pressure within said cooker, said container having a partition therein dividing said container into at least two vertically disposed compartments each with an opening in the bottom thereof for the inserting or removing of food into or from the compartments without separation of said container from said lid, hinged closure means for each of said openings, and means for maintaining said closure means in closed position but permitting selective opening thereof, said container being adapted for insertion and removal of food into and from the compartments thereof by removing and inverting said lid and container to dispose said openings upwardly, whereupon the user may selectively open said closure means, insert or remove food into or from one or more of said compartments, operate said closure means to closed position, and replace the lid and associated container on said cooker.

2. A steam pressure cooker as defined in claim 1 wherein said partition is readily removable from and replaceable within said auxiliary food container to permit selective use of the entire container for the cooking of one food when said partition is removed or of the individual compartments for the cooking of different foods when said partition is in place within said container.

3. A steam pressure cooker as defined in claim 1 wherein the hinged closure means for the bottom openings of each compartment are mounted on a common hinge and a spring element is provided for each closure means, each of said spring elements being arranged for over-center action with respect to the axis of said common hinge upon movement of the closure means between fully closed and fully open positions, whereby to hold the closure means in either of said positions.

4. A steam pressure cooker as defined in claim 1 wherein the hinged closure means for the bottom openings are mounted on a common hinge and wherein interengageable spring clips are provided on said closure means for engagement when said closure means are in open position to resiliently maintain the same in said open position.

5. A steam pressure cooker as defined in claim 4 wherein said spring clips resiliently engage the wall defining the bottom opening of said auxiliary food container when said closure means are in closed position to resiliently maintain the same in said position.

JOHN H. HILLDALE.

REFERENCES CITED

The following references are of record in the file of this patent:

UNITED STATES PATENTS

| Number | Name | Date |
|---|---|---|
| 594,564 | Schaellibaum | Nov. 30, 1897 |
| 819,940 | Smith | May 8, 1906 |
| 1,037,625 | Hofer | Sept. 3, 1912 |
| 1,196,385 | Mutch | Aug. 29, 1916 |
| 1,227,463 | Luyties | May 22, 1917 |
| 1,444,043 | Slocomb | Feb. 6, 1923 |
| 1,606,811 | Schilke | Nov. 16, 1926 |
| 1,657,152 | Dahl | Jan. 24, 1928 |
| 1,804,163 | Herold | May 5, 1931 |
| 2,065,908 | Pihl | Dec. 29, 1936 |
| 2,187,029 | Hevers | Jan. 16, 1940 |
| 2,522,152 | Wilson | Sept. 12, 1950 |